(12) United States Patent
Endo (10) Patent No.: US 8,327,618 B2
(45) Date of Patent: Dec. 11, 2012

(54) CATALYST DEGRADATION DETERMINATION DEVICE FOR INTERNAL COMBUSTION ENGINE

(75) Inventor: Yoshiyuki Endo, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 507 days.

(21) Appl. No.: 12/532,411

(22) PCT Filed: Mar. 28, 2008

(86) PCT No.: PCT/JP2008/056065
§ 371 (c)(1),
(2), (4) Date: Sep. 22, 2009

(87) PCT Pub. No.: WO2008/123412
PCT Pub. Date: Oct. 16, 2008

(65) Prior Publication Data
US 2010/0077729 A1   Apr. 1, 2010

(30) Foreign Application Priority Data
Mar. 30, 2007 (JP) ................................. 2007-094667

(51) Int. Cl.
*F01N 3/00* (2006.01)
(52) U.S. Cl. ........................................................ 60/277
(58) Field of Classification Search .................. 60/276, 60/277
See application file for complete search history.

(56) References Cited

U.S. PATENT DOCUMENTS

| | | | | |
|---|---|---|---|---|
| 6,018,945 A * | 2/2000 | Nakagawa | ....................... | 60/285 |
| 6,502,389 B2 * | 1/2003 | Katayama et al. | ............... | 60/285 |
| 6,668,813 B2 * | 12/2003 | Azuma et al. | ................... | 123/687 |
| 6,941,745 B2 * | 9/2005 | Ikemoto et al. | .................. | 60/285 |
| 7,159,388 B2 * | 1/2007 | Nakagawa et al. | ............. | 60/285 |
| 7,278,394 B2 * | 10/2007 | Okazaki et al. | ................. | 123/305 |
| 7,472,697 B2 * | 1/2009 | Morita et al. | ................... | 123/679 |
| 2003/0070421 A1 * | 4/2003 | Sakai | .............................. | 60/277 |

(Continued)

FOREIGN PATENT DOCUMENTS

| JP | 9-41952 | 2/1997 |
|---|---|---|
| JP | 2001 329832 | 11/2001 |
| JP | 2003 166414 | 6/2003 |

(Continued)

OTHER PUBLICATIONS

Office Action issued Mar. 2, 2011, in Chinese Patent Application No. 200880008416.0.

*Primary Examiner* — Binh Q Tran
*Assistant Examiner* — Dapinder Singh
(74) *Attorney, Agent, or Firm* — Oblon, Spivak, McClelland, Maier & Neustadt, L.L.P.

(57) ABSTRACT

A catalyst deterioration determination device for determining deterioration of an exhaust gas purging catalyst arranged in an exhaust passage of an internal combustion engine is disclosed. The determination device forcibly changes an air-fuel ratio of an air-fuel mixture, calculates an oxygen occlusion amount of the catalyst based on an oxygen concentration of the exhaust gas at a downstream side of the catalyst that varies after the forcible changing of the air-fuel ratio, and performs deterioration determination on the catalyst based on the calculated oxygen occlusion amount. The determination device includes a prohibition unit which sets a prohibition period when calculating the oxygen occlusion amount after the increasing correction ends to prohibit calculation of the oxygen occlusion amount immediately after the increasing correction ends. The prohibition unit variably sets the prohibition period to be longer as a total increased amount of fuel during the increasing correction increases.

14 Claims, 7 Drawing Sheets

U.S. PATENT DOCUMENTS

| | | | |
|---|---|---|---|
| 2003/0192305 A1* | 10/2003 | Iihoshi et al. | 60/277 |
| 2003/0221415 A1* | 12/2003 | Rosel et al. | 60/277 |
| 2005/0022510 A1 | 2/2005 | Nakagawa et al. | |
| 2007/0220862 A1* | 9/2007 | Suehiro et al. | 60/277 |
| 2007/0220863 A1* | 9/2007 | Iida et al. | 60/277 |

FOREIGN PATENT DOCUMENTS

| | | |
|---|---|---|
| JP | 2005 48711 | 2/2005 |
| JP | 2005 76496 | 3/2005 |
| JP | 2006 291773 | 10/2006 |

\* cited by examiner

CATALYST DEGRADATION DETERMINATION DEVICE FOR INTERNAL COMBUSTION ENGINE

FIELD OF THE INVENTION

The present invention relates to a device for determining deterioration of a catalyst arranged in an internal combustion engine.

BACKGROUND OF THE INVENTION

In an internal combustion engine, a catalyst for purging exhaust gas is arranged in an exhaust passage to purge exhaust components. The purging of exhaust components with the catalyst is efficiently performed when the air-fuel ratio of the air-fuel mixture burned in the internal combustion engine is within a predetermined range. To adjust the air-fuel ratio to be within the predetermined range, air-fuel ratio feedback control is normally executed to increase or decrease and thereby correct the injected amount of fuel supplied to the internal combustion. Specifically, an oxygen sensor, which detects the oxygen concentration in the exhaust gas, is arranged at the upstream side of the catalyst in the exhaust passage. In air-fuel ratio feedback control, the air-fuel ratio of the air-fuel mixture is determined based on an output signal of the sensor. To adjust the detected air-fuel ratio to a target air-fuel ratio, an air-fuel ratio correction value is obtained for the fuel injection amount. The fuel injection amount is increased or decreased and thereby corrected based on the air-fuel ratio correction value.

Further, a so-called air-fuel ratio sub-feedback control may be executed to calculate a revised value for the air-fuel ratio correction value. Specifically, an oxygen sensor, which detects the oxygen concentration in the exhaust gas, is arranged at the downstream side of the catalyst in the exhaust passage to determine the state of exhaust components purged by the catalyst. In the sub-feedback control, the revised value for the air-fuel ratio correction value is determined based on an output signal of the sensor.

When deterioration of the catalyst advances, the purging of the exhaust becomes insufficient even if the air-fuel ratio of the air-fuel mixture is properly controlled. Therefore, various types of devices for determining deterioration of the catalyst have been proposed in the prior art.

For example, in the device described in patent document 1, catalyst deterioration is determined in the following manner.

The catalyst occludes oxygen from the exhaust gas if the oxygen concentration of the exhaust gas passing through the catalyst is higher than the oxygen concentration of when the air-fuel mixture is burned at the stoichometric air-fuel ratio. If the oxygen concentration of the exhaust gas passing through the catalyst is lower than the oxygen concentration of when the air-fuel mixture is burned at the stoichometric air-fuel ratio, the catalyst releases the occluded oxygen. In this manner, the catalyst has an oxygen storage function. Thus, when changing the air-fuel ratio of the air-fuel mixture in the combustion chamber from a rich (low) state to a lean (high) state, the oxygen concentration of the exhaust gas at the downstream side of the catalyst becomes high after the catalyst completes oxygen occlusion. When changing the air-fuel ratio of the air-fuel mixture in the combustion chamber from a lean state to a rich state, the oxygen concentration of the exhaust at the downstream side of the catalyst becomes low after the catalyst releases oxygen. Accordingly, the oxygen occlusion amount of the catalyst may be estimated by monitoring changes in the oxygen concentration at the downstream side of the catalyst after changing the air-fuel ratio of the air-fuel mixture. The oxygen occlusion amount is apt to decrease as deterioration of the catalyst advances. Thus, in the device described in the above document, the oxygen occlusion amount of the catalyst for the above-described situation is estimated, and deterioration of the catalyst is determined based on the estimated value.

In an internal combustion engine, the fuel injection amount may undergo an increasing correction so that the air-fuel ratio of the air-fuel mixture becomes richer than the stoichometric air-fuel ratio such as during acceleration or the like. The amount of fuel relative to the air becomes excessive when the increasing correction of the fuel is performed. Thus, unburned fuel is apt to be discharged into the exhaust passage. Unburned fuel discharged in such a manner remains in the exhaust passage until a certain time elapses from when the increasing correction of the fuel injection amount ends. Therefore, when calculating the oxygen occlusion amount after the increasing correction ends, such residual unburned fuel may result in erroneous correction of the oxygen occlusion amount. This may adversely affect the deterioration determination of the catalyst.

Patent Document 1: Japanese Laid-Open Patent Publication No. 2001-329832

SUMMARY OF THE INVENTION

It is an object of the present invention to provide a catalyst deterioration determination device for an internal combustion engine that further accurately calculates the oxygen occlusion amount when calculating the oxygen occlusion amount of the catalyst after an increasing correction is performed on the fuel injection amount.

To achieve the above object, one aspect of the present invention is a catalyst deterioration determination device for determining deterioration of an exhaust gas purging catalyst arranged in an exhaust passage of an internal combustion engine. The determination device forcibly changes an air-fuel ratio of an air-fuel mixture, calculates an oxygen occlusion amount of the catalyst based on an oxygen concentration of the exhaust gas at a downstream side of the catalyst that varies after the forcible changing of the air-fuel ratio, and performs deterioration determination on the catalyst based on the calculated oxygen occlusion amount. The engine includes a function for performing increasing correction on a fuel injection amount so that the air-fuel ratio of the air-fuel mixture becomes richer than the stoichometric air-fuel ratio. A prohibition unit sets a prohibition period when calculating the oxygen occlusion amount after the increasing correction ends to prohibit calculation of the oxygen occlusion amount immediately after the increasing correction ends. The prohibition unit variably sets the prohibition period to be longer as a total increased amount of fuel during the increasing correction increases.

DETAILED DESCRIPTION OF THE PREFERRED EMBODIMENTS

A first embodiment of a catalyst deterioration determination device for an internal combustion engine according to the present invention will now be discussed with reference to FIGS. 1 to 6.

Figure 1:
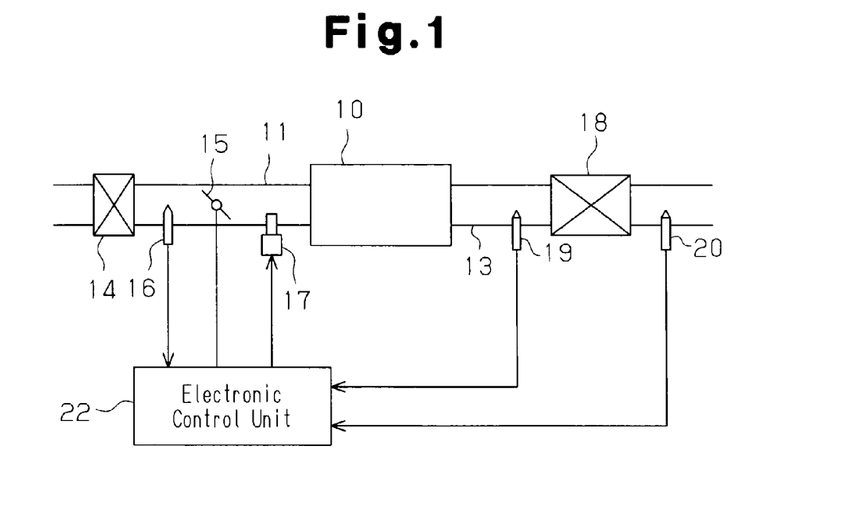
FIG. 1 is a schematic diagram showing an internal combustion engine and its peripheral structure to which a first embodiment of a catalyst deterioration determination device according to the present invention is applied.

FIG. 1 is a schematic diagram showing an internal combustion engine 10 and its peripheral structure to which a catalyst deterioration determination device according to the present invention is applied.

As shown in FIG. 1, the internal combustion engine 10 includes an intake passage 11 in which a throttle valve 15 is arranged to allow for the passage area of the intake passage 11 to be varied. The open amount of the throttle valve 15 is controlled to adjust the amount of air that is drawn in through an air cleaner 14. The amount of air that is drawn in (intake air amount GA) is detected by an airflow meter 16. The air drawn into the intake passage 11 is mixed with fuel injected from a fuel injection valve 17, which is arranged in the intake passage 11 downstream to the throttle valve 15. The air-fuel mixture is then sent to a combustion chamber and burned.

Exhaust gas, which is generated in the combustion chamber when the air-fuel mixture is burned, is discharged into an exhaust passage 13. An exhaust purging catalyst 18 is arranged in the exhaust passage 13 to purge components in the exhaust gas. In a state in which combustion is performed in the vicinity of the stoichiometric air-fuel ratio, the catalyst 18 functions to purge the exhaust gas by oxidizing the HC and CO in the exhaust and reducing the Nox in the exhaust gas. Further, the catalyst 18 occludes oxygen from the exhaust gas if the oxygen concentration of the exhaust passing through the catalyst 18 is higher than the oxygen concentration of when the air-fuel mixture is burned at the stoichiometric air-fuel ratio, and the catalyst 18 releases the occluded oxygen if the oxygen concentration of the exhaust passing through the catalyst 18 is lower than the oxygen concentration of when the air-fuel mixture is burned at the stoichiometric air-fuel ratio. In this manner, the catalyst 18 functions as an oxygen storage.

An air-fuel ratio sensor 19 is arranged in the exhaust passage 13 at the upstream side of the catalyst 18 to detect the oxygen concentration of the exhaust gas. Further, an oxygen sensor 20 is arranged in the exhaust passage 13 at the downstream side of the catalyst 18 to detect the oxygen concentration of the exhaust.

The air-fuel ratio sensor 19 is a known limiting current type oxygen sensor. The limiting current type oxygen sensor includes a ceramic layer, which is referred to as a diffusion-controlled layer, at a detection portion of a concentration cell type oxygen sensor so as to generate output current that is in accordance with the oxygen concentration of the exhaust.

When the air-fuel ratio, which has a close relationship with the oxygen concentration of the exhaust gas, is stoichiometric, the output current of the air-fuel ratio sensor 19 is "0". In other words, when the oxygen concentration of the exhaust at the upstream side of the catalyst 18 is equal to the oxygen concentration of the exhaust gas when the air-fuel mixture is burned under the stoichiometric air-fuel ratio, the output voltage is "0". As the air-fuel ratio becomes richer (as the oxygen concentration of the exhaust gas decreases), the output current increases in the negative direction. As the air-fuel ratio becomes leaner (as the oxygen concentration of the exhaust increases), the output current increases in the positive direction. Accordingly, based on the output of the air-fuel ratio sensor 19, the richness level and leanness level may be determined for the air-fuel ratio of the air-fuel mixture in the combustion chamber. The air-fuel ratio determined from the output of the air-fuel ratio sensor 19 is based on the oxygen concentration of the exhaust gas at the upstream side of the catalyst 18 and reflects the air-fuel ratio of the air-fuel mixture in the combustion chamber. For the sake of convenience, this air-fuel ratio will hereinafter be referred to as the "upstream air-fuel ratio".

Further, the oxygen sensor 20 is a known concentration cell type oxygen sensor. The concentration cell outputs voltage of approximately 1 V when the air-fuel ratio is richer than the stoichiometric air-fuel ratio. When the air-fuel ratio is leaner than the stoichiometric air-fuel ratio, the output voltage is approximately 0 V. In other words, if the oxygen concentration of the exhaust at the downstream side of the catalyst 18 is lower than the oxygen concentration of the exhaust gas when the air-fuel mixture is burned under the stoichiometric air-fuel ratio, the output voltage of the oxygen sensor 20 is approximately 1 V. Otherwise, the output voltage is approximately 0 V. Further, the output voltage of the oxygen sensor 20 changes greatly in the vicinity of the oxygen concentration that corresponds to the stoichiometric air-fuel ratio. Accordingly, based on the output of the oxygen sensor 20, it can be determined whether the oxygen concentration of the exhaust gas at the downstream side of the catalyst 18 is high or low relative to the oxygen concentration of the exhaust when the air-fuel mixture is burned under the stoichiometric air-fuel ratio. The air-fuel ratio determined from the output of the oxygen sensor 20 is based on the oxygen concentration of the exhaust gas at the downstream side of the catalyst 18 when oxygen is occluded or released and thereby does not necessarily reflect the air-fuel ratio of the air-fuel mixture. For the sake of convenience, this air-fuel ratio will hereinafter be referred to as the "downstream air-fuel ratio".

The oxygen sensor 20 is arranged in the exhaust passage 13 at the downstream side of the catalyst 18 to monitor the exhaust gas purging function of the catalyst 18. That is, if the output of the oxygen sensor 20 indicates a lean air-fuel ratio when the output of the air-fuel ratio sensor 19 indicates a rich air-fuel ratio, oxygen is released from the catalyst 18. This shows that the oxidizing function of the catalyst 18 is effective. If the output of the oxygen sensor 20 indicates a rich air-fuel ratio when the output of the air-fuel ratio sensor 19 indicates a lean air-fuel ratio, oxygen is occluded in the catalyst 18. This shows that the reducing function of the catalyst 18 is effective.

The catalyst 18 efficiently purges the exhaust gas from all of the main toxic components (HC, CO, Nox) through a reduction reaction only when the air-fuel ratio of the burned air-fuel mixture is within a narrow range (window) in the vicinity of the stoichiometric air-fuel ratio. For the catalyst 18 to function effectively, accurate air-fuel ratio control becomes necessary so that the air-fuel ratio of the air-fuel mixture comes into the center of the window.

Such control of the air-fuel ratio is executed by an electronic control unit (ECU) 22. The ECU 22 receives detection signals from various types of sensors, such as the airflow meter 16, the air-fuel ratio sensor 19, the oxygen sensor 20, a pedal depression amount sensor detecting the depression amount of an acceleration pedal, and a rotation speed sensor detecting the engine speed. In accordance with the operation state of the internal combustion engine 10 that is determined from the detection signal of these sensors, the ECU 22 drives and controls the throttle valve 15, fuel injection valve 17, and the like to control the air-fuel ratio as described above. The air-fuel ratio control executed by the ECU 22 may be summarized as described below.

First, the ECU 22 obtains a request amount for the intake air amount determined in accordance with the detection result of the depression amount of the acceleration pedal and the engine speed. Then, the ECU 22 adjusts the open amount of the throttle valve 15 so that the intake air amount comes into correspondence with the request amount. At the same time, the ECU 22 obtains the amount of fuel necessary to obtain the stoichometric air-fuel ratio for the actual measurement value of the intake air amount detected by the airflow meter 16 and then accordingly adjusts the amount of fuel injected from the fuel injection valve 17. As a result, the air-fuel ratio of the air-fuel mixture burned in the combustion chamber approaches the stoichometric air-fuel ratio for a certain extent. However, this is insufficient for the high accuracy required for air-fuel ratio control.

Therefore, the ECU 22 determines the actual measurement value of the upstream air-fuel ratio from the detection result of the air-fuel ratio sensor 19. Then, the ECU 22 calculates an air-fuel ratio feedback correction amount based on the deviation of the actual measurement value from a target air-fuel ratio TAF (normally, the stoichometric air-fuel ratio). The air-fuel ratio feedback correction amount is used for feedback correction of the fuel injection amount of the fuel injection valve 17. The air-fuel ratio feedback control ensures the accuracy required for air-fuel ratio control.

Further, the ECU 22 revises the air-fuel ratio feedback correction amount based on the detection result of the oxygen sensor 20. In the revision process, a sub-feedback correction amount, which is calculated from the output of the oxygen sensor 20, undergoes an increasing or decreasing correction, and the sub-feedback correction amount is used to revise the air-fuel ratio feedback correction amount. In detail, when the output of the oxygen sensor 20 indicates a rich air-fuel ratio, the sub-feedback correction amount is increased toward the negative side in fixed amounts so that the upstream air-fuel ratio is varied in fixed amounts to become leaner, that is, so that the upstream air-fuel ratio gradually becomes leaner. When the output of the oxygen sensor 20 indicates a lean air-fuel ratio, the sub-feedback correction amount is increased toward the positive side in fixed amounts so that the upstream air-fuel ratio is varied in fixed amounts to become richer, that is, so that the upstream air-fuel ratio gradually becomes richer. Due to such sub-feedback control, the purging function of the catalyst 18 is effectively utilized.

In this manner, in the present embodiment, exhaust gas is purged by the air-fuel ratio control and the catalyst 18.

Further, when the engine operation state is in a predetermined state, the ECU 22 performs an increasing correction on the fuel injection amount so that the air-fuel ratio of the air-fuel mixture is richer than the stoichometric air-fuel ratio. Examples of such a predetermined state include a state in which the internal combustion engine 10 must be shifted from a normal state to an acceleration state to increase the output, a state in which the combustion temperature of the air-fuel mixture must be prevented from becoming excessively high, and a state in which misfiring must be prevented when the internal combustion engine 10 shifts from a normal state to a weak deceleration state. When performing the increasing correction on the fuel injection amount, the target air-fuel ratio TAF is set to be richer than the stoichometric air-fuel ratio based on the engine operation state, and an increase coefficient RK, which is an increase correction value for a basic fuel injection amount, is set so that the actual air-fuel ratio matches the target air-fuel ratio TAF, which is set at the rich side.

However, as deterioration of the catalyst 18 advances, exhaust gas cannot be sufficiently purged even if the air-fuel ratio control is properly executed. Thus, in the present embodiment, deterioration of the catalyst 18 is determined as described below.

As mentioned above, the catalyst 18 includes an oxygen storage function, and the oxygen occlusion amount of the catalyst 18 is apt to decreasing as deterioration of the catalyst 18 advances. Therefore, in the present embodiment, the oxygen occlusion amount of the catalyst 18 is estimated, and deterioration of the catalyst 18 is determined based on the estimated value.

When determining deterioration of the catalyst 18 based on the oxygen occlusion amount, an oxygen occlusion amount C of the catalyst 18 is obtained through an active control that will now be discussed. In the active control, whenever the output of the oxygen sensor 20 is inverted, the target air-fuel ratio (upstream air-fuel ratio) TAF is inverted from rich to lean or from lean to rich.

Figure 2:
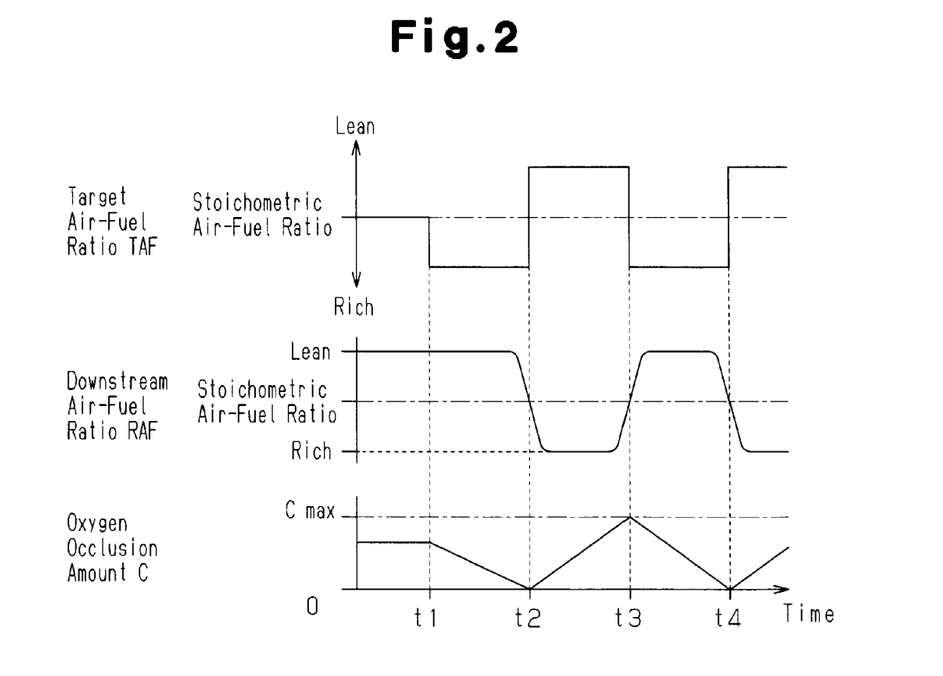
FIG. 2 is a timing chart used to estimate an oxygen occlusion amount in the catalyst of FIG. 1.

FIG. 2 shows changes when the active control is executed in the target air-fuel ratio TAF, the downstream air-fuel ratio RAF detected by the oxygen sensor 20, and the oxygen occlusion amount C.

At time t1, when the active control starts with the output of the oxygen sensor 20 indicating a lean state, the target air-fuel ratio TAF is shifted from the stoichometric air-fuel ratio to the rich side as shown in FIG. 2. In this manner, when the target air-fuel ratio TAF is forcibly changed to the rich side, the fuel injection amount is increased. Thus, the upstream air-fuel ratio becomes rich.

During a period in which the upstream air-fuel ratio is richer than the stoichometric air-fuel ratio, oxygen is released from the catalyst 18. Thus, the downstream air-fuel ratio RAF detected by the oxygen sensor 20 becomes lean. When all of the oxygen occluded in the catalyst 18 is released, oxygen is no longer supplied to the exhaust gas from the catalyst 18. Thus, at time t2, the downstream air-fuel ratio RAF is inverted to be rich. Such inversion of the output of the oxygen sensor 20 shows that all of the oxygen occluded in the catalyst 18 has been released.

At time t2, when the output of the oxygen sensor 20 is inverted from a lean state to a rich state, the target air-fuel ratio TAF is changed to be leaner than the stoichometric air-fuel ratio. This decreases the fuel injection amount and the upstream air-fuel ratio consequently becomes lean.

During a period in which the upstream air-fuel ratio is leaner than the stoichometric air-fuel ratio, the catalyst 18 occludes oxygen from the exhaust. Thus, the downstream air-fuel ratio RAF detected by the oxygen sensor 20 becomes rich. When the oxygen occlusion of the catalyst 18 reaches a limit, the catalyst 18 no longer occludes oxygen from the exhaust gas. Thus, at time t3, the downstream air-fuel ratio RAF is inverted to be lean. Such inversion of the output of the oxygen sensor 20 shows that the oxygen occlusion amount of the catalyst 18 has reached a limit (maximum oxygen occlusion amount Cmax).

At time t3, when the output of the oxygen sensor 20 is inverted from a rich state to a lean state, the target air-fuel ratio TAF is changed again to be richer than the stoichometric air-fuel ratio.

During a period in which the upstream air-fuel ratio is richer than the stoichometric air-fuel ratio, oxygen is released from the catalyst 18. Thus, the downstream air-fuel ratio RAF detected by the oxygen sensor 20 becomes lean. When all of the oxygen occluded in the catalyst 18 is released, oxygen is no longer supplied to the exhaust gas from the catalyst 18. Thus, at time t4, the downstream air-fuel ratio RAF is inverted to be rich. Such inversion of the output of the oxygen sensor 20 shows that all of the oxygen occluded in the catalyst 18, that is, the maximum oxygen occlusion amount Cmax, has been released.

When active control is being executed in such a manner, the upstream air-fuel ratio is forcibly changed based on the downstream air-fuel ratio RAF. In other words, the air-fuel ratio of the air-fuel mixture is forcibly changed based on the oxygen concentration of the exhaust gas at the downstream side of the catalyst 18. After this forcible changing, the downstream air-fuel ratio RAF (oxygen concentration of the exhaust gas at the downstream side of the catalyst 18) is changed. Based on the change in the downstream air-fuel ratio RAF, a state in which all of the oxygen occluded in the catalyst 18 is released and a state in which the oxygen occlusion amount of the catalyst 18 reaches the limit amount may be determined. Accordingly, by cumulating the amount of oxygen that enters the catalyst 18 when the upstream air-fuel ratio is lean and the downstream air-fuel ratio RAF is rich, the oxygen occlusion amount C of the catalyst 18 may be estimated. Further, by cumulating the insufficient oxygen amount in the exhaust gas that enters the catalyst 18 when the upstream air-fuel ratio is rich and the downstream air-fuel ratio RAF is lean, an oxygen release amount COUT of the catalyst 18 may be estimated. Here, the phrase of "the insufficient oxygen amount in the exhaust gas that enters the catalyst 18" refers to the difference between the oxygen amount in the exhaust gas that enters the catalyst 18 when an air-fuel mixture having the stoichometric air-fuel ratio is burned and the oxygen amount in the exhaust gas that enters the catalyst 18 when an air-fuel mixture that is richer than the stoichometric air-fuel ratio is burned. The total insufficient oxygen amount of the exhaust gas that enters the catalyst 18 during a predetermined period is equal to the total of the oxygen release amount COUT of the catalyst 18 during the predetermined period. The oxygen released from the catalyst 18 is originally the oxygen that was occluded in the catalyst 18. Thus, the oxygen release amount COUT is about the same as the oxygen occlusion amount C and substantially indicates the oxygen occlusion amount C.

The oxygen storage function of the catalyst 18 becomes less effective in accordance with the deterioration level of the catalyst 18. Thus, when the oxygen occlusion amount of the catalyst 18 is less than a predetermined determination value, the catalyst 18 is determined as having deteriorated to a level that cannot be tolerated.

Figure 3:
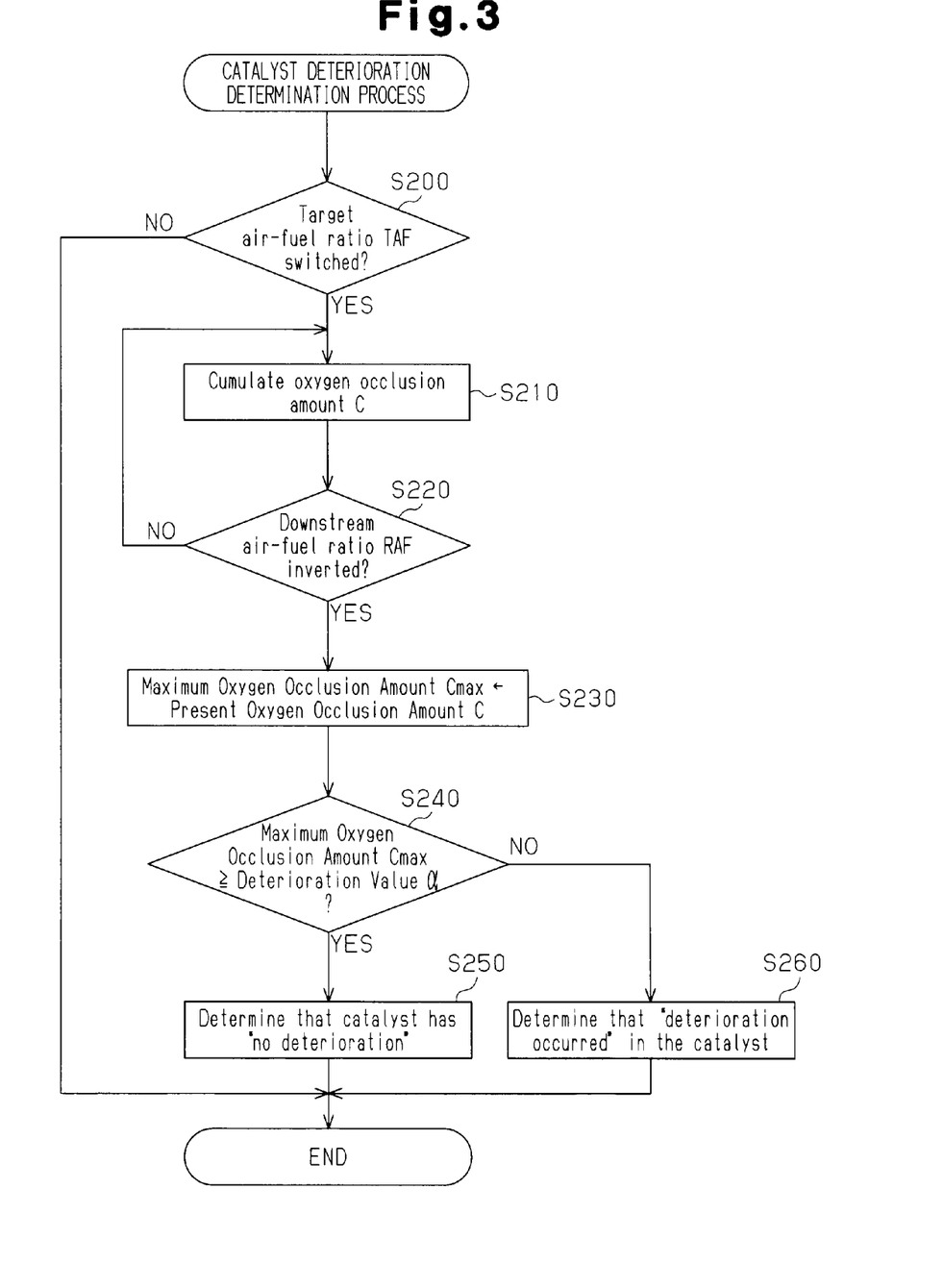
FIG. 3 is a flowchart showing the procedures of a catalyst deterioration determination process performed by an electronic control unit shown in FIG. 1.

FIG. 3 shows the procedures taken in a process for determining deterioration of the catalyst 18. The ECU 22 repetitively executes the present process in predetermined execution cycles when the active control is not executed. Examples of conditions for executing the active control, which may be set as necessary, may include the catalyst 18 having reached an activation temperature, the air-fuel ratio feedback control being executed, and the intake air amount GA being within a suitable range.

When starting the present process, at step S200, it is determined whether or not the target air-fuel ratio TAF has been switched, specifically, whether the target air-fuel ratio TAF has been switched from rich to lean. When determined that the target air-fuel ratio TAF has not been switched, the process is temporarily ended.

When determined in step S200 that the target air-fuel ratio TAF has been switched, that is, when determined that the present state is, for example, as shown in FIG. 2 at time t2, in step S210, the oxygen occlusion amount C is cumulated based on equation (1), which is shown below.

$$\text{present oxygen occlusion amount } C = \text{previous oxygen occlusion amount } C + 0.23 \times \Delta A/F \times \text{fuel injection amount } Q \qquad (1)$$

Here, the "present oxygen occlusion amount C" refers to the most recent oxygen occlusion amount C calculated in the present cycle, and the "previous oxygen occlusion amount C" refers to the past oxygen occlusion amount C calculated in the previous cycle. Further, "0.23" is the ratio of oxygen in air, and "$\Delta A/F$" is a value obtained by subtracting the stoichometric air-fuel ratio from the air-fuel ratio detected by the air-fuel ratio sensor 19. The "fuel injection amount Q" is a value set through fuel injection control, which is executed separately from the present process, and is the amount of fuel supplied to the internal combustion engine 10 when the present process is executed. In equation (1), the value obtained from "$\Delta A/F \times$ fuel injection amount Q" corresponds to the amount of unburned air entering the catalyst 18 during the cycle in which the present process is being executed. The value obtained by multiplying "$\Delta A/F \times$ fuel injection amount Q" by "0.23" corresponds to the amount of unburned oxygen. The unburned oxygen is occluded in the catalyst 18. Accordingly, the most recent oxygen occlusion amount C for the present cycle is calculated from equation (1).

Next, in step S220, it is determined whether or not the downstream air-fuel ratio RAF has been inverted, more specifically, whether an inversion from rich to lean has been carried out. When determined that the downstream air-fuel ratio RAF has not been inverted, step S210 is performed again in the next cycle. The cumulation of the oxygen occlusion amount C is repeated until the downstream air-fuel ratio RAF is inverted.

When determined in step S220 that the downstream air-fuel ratio RAF has been inverted, that is, when determined that the present state is as shown in FIG. 2 at time t3, in step S230, the present oxygen occlusion amount C is set as the maximum oxygen occlusion amount Cmax of the catalyst 18.

Then, in step S240, it is determined whether or not the maximum oxygen occlusion amount Cmax is greater than or equal to a predetermined deterioration determination value α. When the maximum oxygen occlusion amount Cmax is greater than or equal to the predetermined deterioration determination value α, it is determined that the deterioration of the catalyst 18 is within a tolerable range. Accordingly, in step S250, it is determined that the catalyst 18 has "no deterioration", and the present process is then ended. When determined in step S240 that the maximum oxygen occlusion amount Cmax is less than the predetermined deterioration determination value α, deterioration of the catalyst 18 is no longer within the tolerable range. Accordingly, in step S260, it is determined that "deterioration occurred" in the catalyst 18, and the present process is then ended.

In the present embodiment, deterioration of the catalyst 18 is determined based on the oxygen occlusion amount C of the catalyst 18. However, the oxygen release amount COUT may be obtained and compared with a predetermined determination value to determine deterioration of the catalyst 18. Further, the oxygen occlusion amount C and the oxygen release amount COUT may be obtained, and average values of the oxygen occlusion amount C and the oxygen release amount COUT may be compared with predetermined determination values.

As described above, in the internal combustion engine 10, the fuel injection amount undergoes an increasing correction when the engine operation state is in a predetermined state. During such increasing correction of the fuel, the amount of fuel relative to air becomes excessive. Thus, unburned fuel is easily discharged into the exhaust passage 13. The unburned fuel discharged in this manner remains in the exhaust passage 13 until a certain amount of time elapses from when the increasing correction of the fuel ends. Thus, calculation of the oxygen occlusion amount C in a state in which unburned fuel is remaining in the exhaust passage 13 may result in an erroneous oxygen occlusion amount C. This may adversely affect the deterioration determination of the catalyst 18. The unburned fuel lowers the calculation accuracy of the oxygen occlusion amount C because, for example, unburned fuel collects on the oxygen sensor 20 or catalyst 18 and destabilizes the calculation of the oxygen occlusion amount C.

When the oxygen occlusion amount C is calculated after the increasing correction of the fuel injection amount ends, the time required to decrease the residual unburned fuel in the exhaust passage 13 to a level that does not affect the calculation of the oxygen occlusion amount C (hereinafter referred to as the influence period) has the following tendency. The influence period becomes longer as the increasing correction value increases when performing the increasing correction on the fuel injection amount or when the time for performing increasing correction on the fuel injection amount becomes longer even if the increasing correction value is small. In other words, the influence period becomes longer as the total increased amount of the fuel injected when performing increasing correction on the fuel injection amount (hereinafter referred to as the total increased amount) increases.

Therefore, in the present embodiment, when calculating the oxygen occlusion amount C after the increasing correction of the fuel injection amount ends, a prohibition period is provided during which calculation of the oxygen occlusion amount C is prohibited immediately after the increasing correction ends. The prohibition period is variably set to be longer as the total increased amount of fuel increases during the increasing correction. As a result, when calculating the oxygen occlusion amount C of the catalyst 18 after the increasing correction of the fuel injection amount is performed, the oxygen occlusion amount C may be calculated further accurately.

A mask process for prohibiting calculation of the oxygen occlusion amount C immediately after the increasing correction ends will now be discussed with reference to FIGS. 4 to 6.

Figure 4:
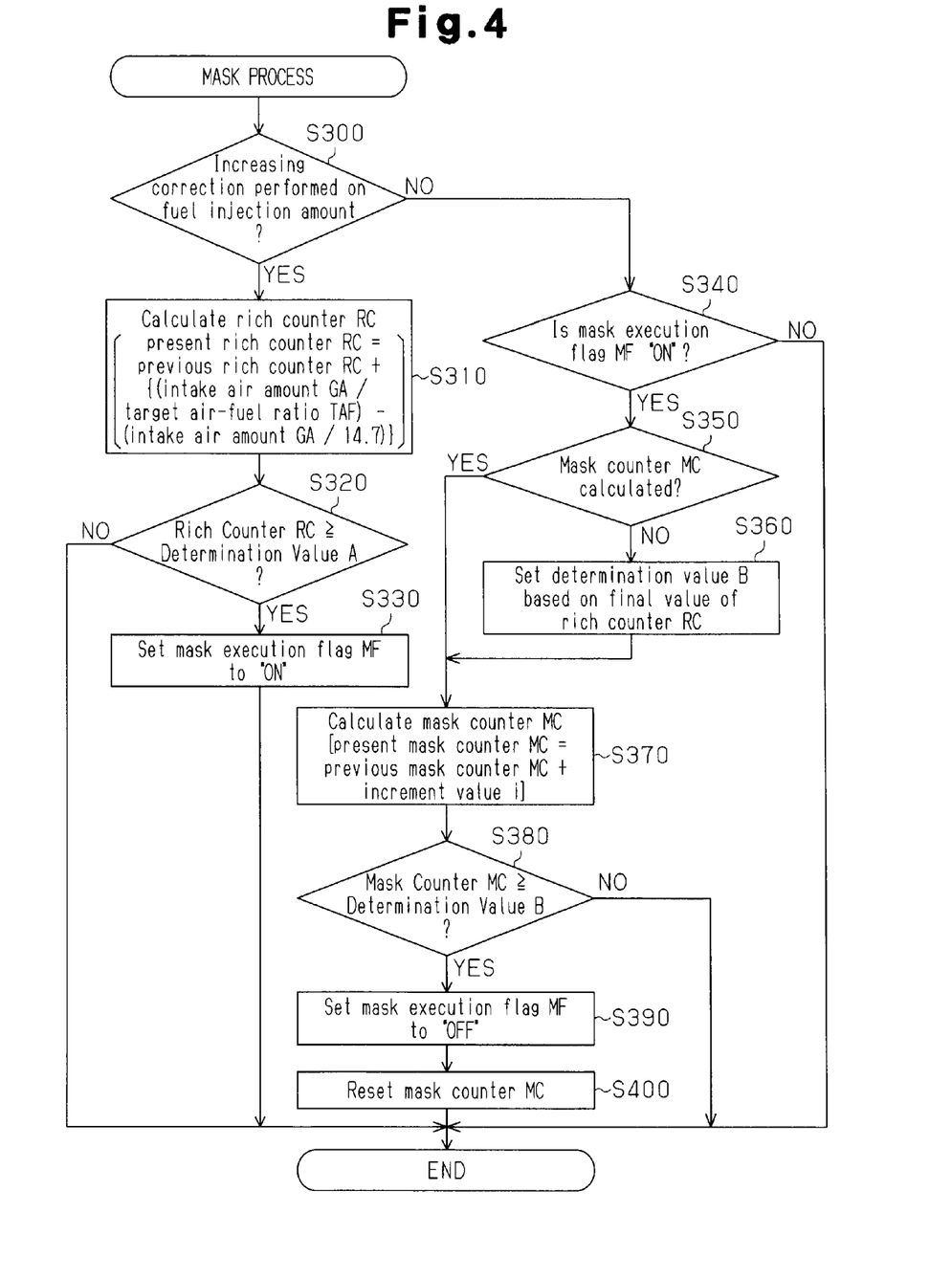
FIG. 4 is a flowchart showing the procedures of a mask process performed by the electronic control unit shown in FIG. 1.
Figure 5:
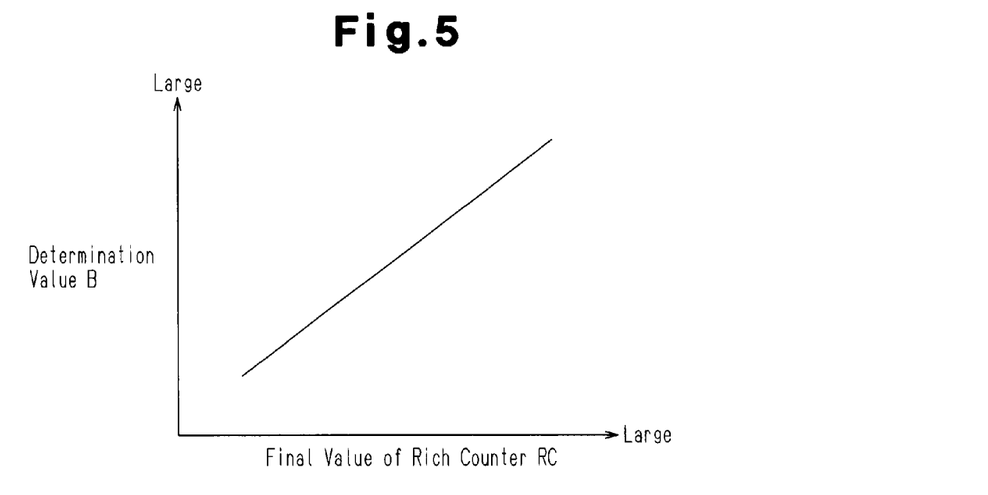
FIG. 5 is a graph used to set a determination value based on a rich counter.

FIG. 4 shows the processing procedures of the mask process. The ECU 22, which functions as a prohibition unit, repetitively performs the present process in predetermined cycles.

When the present process starts, first, in step S300, it is determined whether or not the increasing correction is being performed on the fuel injection amount. When determined in step S300 that the increasing correction is being performed on the fuel injection amount, in step S310, a rich counter RC is calculated based on equation (2), which is shown below.

$$\text{present rich counter } RC = \text{previous rich counter } RC + \{(\text{intake air amount } GA/\text{target air-fuel ratio } TAF) - (\text{intake air amount } GA/14.7)\} \quad (2)$$

In equation (2), the "present rich counter RC" is the most recent rich counter calculated in the present cycle, and the "previous rich counter RC" is a past rich counter RC calculated in the previous cycle. Further, the value obtained from "(intake air amount GA/target air-fuel ratio TAF)" is the present fuel injection amount calculated from the present intake air amount GA, which is detected by the airflow meter 16, and the presently set target air-fuel ratio TAF. In the fuel injection amount that has undergone the increasing correction, there is a possibility of a certain amount of fuel not being burned in the combustion chamber. This certain amount is the value obtained from "(intake air amount GA/14.7)", which shows the injected amount of fuel that is surplus to the stoichometric air-fuel ratio. Such increase of the fuel amount is added to the "previous rich counter RC" to obtain the "present rich counter RC", which is a cumulative value that cumulates increased amounts of the fuel in predetermined time intervals during the increasing correction of the fuel injection amount. Accordingly, equation (2) is used to calculate the total increased amount of the fuel injected from when the increasing correction of the fuel injection amount starts to when the present process is executed in the present cycle.

Next, in step S320, it is determined whether the rich counter RC updated in step S310 is greater than or equal to a predetermined determination value A. Step S320 is processed for the reasons described below.

If the total increased amount of fuel during the fuel increasing is relatively small, the amount of unburned fuel discharged into the exhaust passage 13 is small. Thus, the influence on the calculation accuracy of the oxygen occlusion amount C is also small. Therefore, the process for prohibiting calculation of the oxygen occlusion amount C from immediately after the increasing correction ends to when the prohibition period elapses is suspended when the rich counter RC, which corresponds to the total increased amount of fuel, is less than the determination value A. This prevents unnecessary setting of a period for prohibiting calculation of the oxygen occlusion amount C. A total increased amount that does not affect the calculation accuracy of the oxygen occlusion amount C is set as the determination value A.

In step S320, when the rich counter RC is less than the determination value A, the present process is temporarily ended.

When determined in step S320 that the rich counter RC is greater than or equal to the determination value A, to perform the process for setting the prohibition period, in step S330, a mask execution flag MF is changed from "OFF" to "ON" and then the present process is temporarily ended. When the mask execution flag MF is set to "ON", execution of the active control and the deterioration determination process is prohibited. This prohibits calculation of the oxygen occlusion amount C.

When the increasing correction of the fuel injection amount is performed in this manner, the calculation and updating of the rich counter RC are performed.

When determined in step S300 that the increasing correction of the fuel injection amount is not performed, it is determined in step S340 whether or not the mask execution flag MF is set to "ON". When determined in step S340 that the mask execution flag MF is set to "OFF", the prohibition period is not set, and the present process is temporarily ended.

When determined in step S340 that the mask execution flag MF is set to "ON", in step S350, it is determined whether or not a mask counter MC, which will be described later, has been calculated. When determined in step S350 that the mask counter MC has not yet been calculated, in step S360, a determination value B is set based on a final value of the rich counter RC, that is, the value of the rich counter RC immediately after the increasing correction of the fuel injection amount ends. The determination value B is variably set as shown in FIG. 5 so as to be larger as the final value of the rich counter RC becomes larger.

After the determination value B is set in this manner or when determined in step S350 that the mask counter MC has been calculated and the determination value B has thereby already been set, in step S370, the calculation and updating of the mask counter MC are performed based on equation (3), which is shown below.

$$\text{present mask counter MC=previous mask counter MC+increment value } i \quad (3)$$

In equation (3), the "present mask counter MC" is the most recent mask counter MC calculated in the present cycle, and the "previous mask counter MC" is a past mask counter MC calculated in the previous cycle. An appropriate value such as "1" is set as the increment value i. The mask counter MC has an initial value set to "0", and the value of the mask counter MC is increased in increments of the increment value whenever step S370 is processed during the repetition of the present process.

Next, in step S380, it is determined whether or not the mask counter MC is greater than or equal to the determination value B. When the mask counter MC is less than the determination value B in step S380, it is determined that the elapsed time from when the increasing correction of the fuel injection amount ends is still within the influence period and the present process is then temporarily ended.

When determined in step S380 that the mask counter MC is greater than or equal to the determination value B, the influence time has completely elapsed from when the increasing correction of the fuel injection amount ends, and the oxygen occlusion amount C may be calculated in a normal manner. Thus, in step S390, the mask execution flag MF is changed from "ON" to "OFF", and execution of the active control and deterioration determination process is allowed. Subsequently, in step S400, the mask counter MC is reset to "0" and the present process is then temporarily ended.

Figure 6:
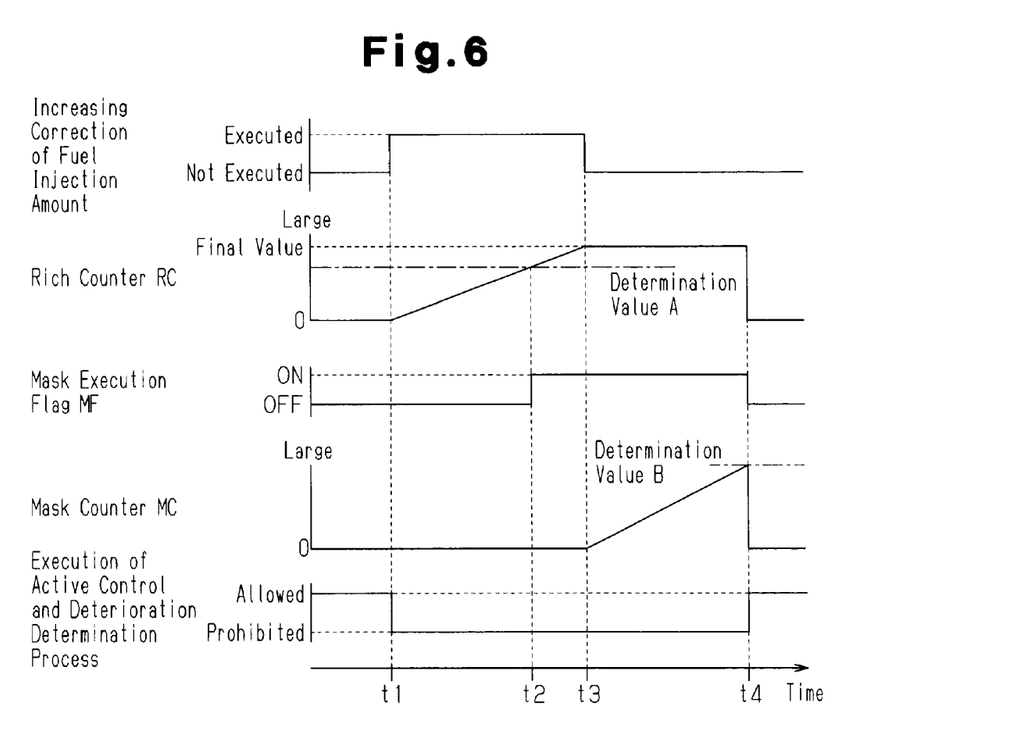
FIG. 6 is a timing chart showing changes in various values when performing the mask process of FIG. 4.

FIG. 6 shows changes in various values when performing the mask process.

At time t1, when the increasing correction of the fuel injection amount starts, the calculation of the rich counter RC starts, and the value of the rich counter RC gradually increases. Then, at time t2, when the value of the rich counter RC becomes greater than or equal to the determination value A, the mask execution flag MF is set to "ON". Afterwards, at time t3, when the increasing correction ends, the updating of the rich counter RC is stopped. In this manner, by updating the rich counter RC from when the increasing correction starts to when it ends, the total increased amount of fuel during the increasing correction is reflected to the final value of the rich counter RC at the point of time when the increasing correction ends.

Further, when the increasing correction ends at time t3, the determination value B is set based on the rich counter RC, and calculation of the mask counter MC is started. The value of the mask counter MC gradually increases as time elapses from after the increasing correction ends. At time t4, when the mask counter MC reaches the determination value B, the mask execution flag MF is set to "OFF" so as to allow execution of the active control and the deterioration determination process after the increasing correction ends, and the rich counter RC is reset to "0".

In this manner, during the period from immediately after when the increasing correction ends to when the mask counter MC reaches the determination value B, calculation of the oxygen occlusion amount C is prohibited so as to set a prohibition period (time t3 to time t4) during which calculation of the oxygen occlusion amount C is prohibited immediately after the increasing correction ends. By providing such a prohibition period, the oxygen occlusion amount C is calculated in a manner avoiding the period in which the oxygen occlusion amount C may be erroneously calculated when affected by the residual unburned fuel resulting from the increasing correction.

The determination value B is variably set to be larger when the value of the rich counter RC is larger at the point of time at which the increasing correction ends. Thus, as the total increased amount during the increasing correction increases, the time required for the mask counter MC to reach the determination value B becomes longer. In this manner, when the total increased amount of the fuel is larger and the influence time is longer, the prohibition period is variably set to be longer. This properly sets the prohibition period in association with the time (the influence time) required for the residual unburned fuel in the exhaust passage 13 to decrease to a level in which it does not affect the calculation of the oxygen occlusion amount C.

In this manner, the present embodiment sets the prohibition period and allows for the prohibition period to be properly set. Thus, when calculating the oxygen occlusion amount C of the catalyst 18 after the increasing correction of the fuel injection amount is performed, the oxygen occlusion amount C may be calculated further accurately. Further, since the oxygen occlusion amount C is calculated further accurately, after performing the increasing correction of the fuel injection amount, deterioration of the catalyst 18 may be determined with higher accuracy.

As described above, the present invention has the advantages described below.

(1) The fuel injection amount may be increased and corrected so that the air-fuel ratio of the air-fuel mixture becomes richer than the stoichometric air-fuel ratio. When calculating the oxygen occlusion amount C after the increasing correction ends, the prohibition period is set to prohibit calculation of the oxygen occlusion amount C immediately after the increasing correction ends. This allows for the oxygen occlusion amount C to be calculated in a manner avoiding the period in which the oxygen occlusion amount C may be erroneously calculated due to the influence of residual unburned fuel.

Further, the prohibition period is variably set to be longer as the total increased amount of fuel increases during the increasing correction. This properly sets the prohibition period in association with the time required for the residual unburned fuel in the exhaust passage 13 to decrease to a level in which it does not affect the calculation of the oxygen occlusion amount C.

Accordingly, when calculating the oxygen occlusion amount C of the catalyst 18 after performing the increasing correction of the fuel injection amount, the oxygen occlusion amount C may be calculated with further accuracy. Further, the oxygen occlusion amount C may be calculated with further accuracy. This allows for an increase in the accuracy for determining deterioration of the catalyst 18 after performing the increasing correction of the fuel injection amount.

(2) The total increased amount of fuel during the increasing correction is calculated by calculating and updating the rich counter RC from when the increasing correction of the fuel injection amount starts to when it ends. Further, the determination value B for the elapsed time after the increasing correction ends is set to be larger as the total increased amount increases, that is, the final value of the rich counter RC becomes larger. Additionally, the period required for the mask counter MC, which indicates the elapsed time after the increasing correction ends, to reach the determination value B is set as the prohibition period. This variably sets the prohibition period to be longer as the total increased amount of fuel increases, that is, as the time required for the residual unburned fuel in the exhaust passage 13 to decrease to a level in which it does not affect the calculation of the oxygen occlusion amount C becomes longer. This properly sets the prohibition period.

(3) The rich counter RC, which cumulates the increased amount of fuel, is calculated in predetermined time intervals during the increasing correction of the fuel injection amount, or whenever the mask process is executed. Thus, the total increased amount of fuel during the increasing correction of the fuel injection amount is properly calculated.

(4) When the total increased amount of fuel is relatively small, the amount of unburned fuel discharged into the exhaust passage 13 becomes small and decreases the influence on the calculation accuracy of the oxygen occlusion amount C. Thus, when the rich counter RC, which indicates the total increased amount, is less than the determination value A, which is set beforehand, the process for prohibiting calculation of the oxygen occlusion amount C until the prohibition period elapses from immediately after the increasing correction ends is suspended. In other words, calculation of the oxygen occlusion amount C is allowed during the prohibition period. This prevents unnecessary setting of the period during which calculation of the oxygen occlusion amount C is prohibited.

A second embodiment of the present invention will now be discussed with reference to FIGS. 7 and 8.

In the first embodiment, calculation of the oxygen occlusion amount C is prohibited until the elapsed time from immediately after the increasing correction of the fuel injection amount ends reaches the determination value B, which is set based on the total increased amount of the fuel injected during the increasing correction. In the present embodiment, such a prohibition period is set in a different manner. This point differs from the first embodiment. A deterioration determination device of the present embodiment will now be discussed centering on such differences.

Figure 7:
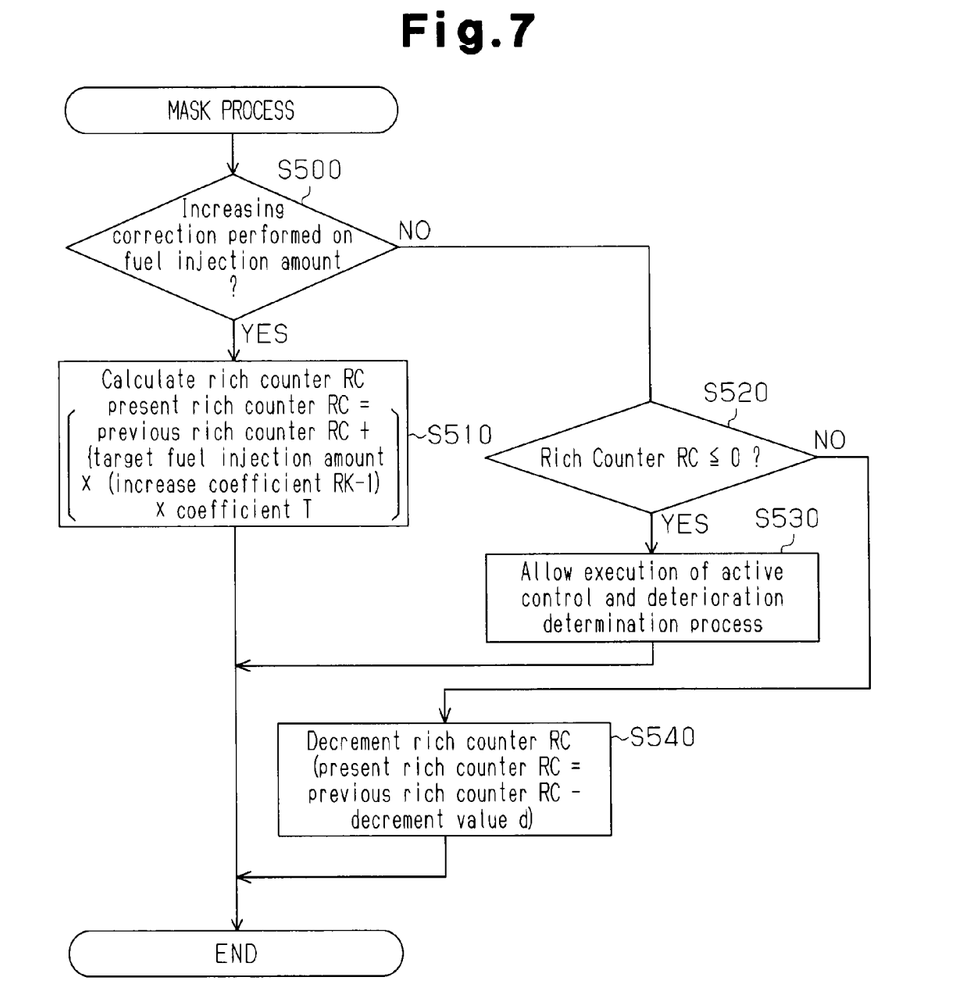
FIG. 7 is a flowchart showing procedures of a mask process in a second embodiment of the present invention.

FIG. 7 shows the processing procedures of a mask process executed in the present embodiment. The present process is repetitively performed in predetermined cycles by the ECU 22.

When the present process starts, first, in step S500, it is determined whether or not increasing correction is being performed on the fuel injection amount. When the increasing correction is being performed, in step S510, a rich counter RC is calculated based on equation (4).

$$\text{present rich counter } RC = \text{previous rich counter } RC + \{\text{target fuel injection amount} \times (\text{increase coefficient } RK - 1)\} \times \text{coefficient } T \quad (4)$$

In equation (4), the "present rich counter RC" is the most recent rich counter calculated in the present cycle, and the "previous rich counter RC" is a past rich counter RC calculated in the previous cycle. Further, the "target fuel injection amount" is a value that reflects the increase coefficient RK on the basic fuel injection amount that is set based on the engine operation state. The amount of fuel injected from the fuel injection valve 17 is controlled by the target fuel injection amount. In the fuel injection amount that has undergone the increasing correction, there is a possibility of a certain amount of fuel not being burned in the combustion chamber. This certain amount is the value obtained from "target fuel injection amount×(increase coefficient RK−1)", which is obtained by multiplying the target fuel injection amount by the "(increase coefficient RK−1)" and which shows the injected amount of fuel that is surplus to the stoichometric air-fuel ratio.

Further, coefficient T is a value as indicated in equation (5).

$$\text{coefficient } T = \text{engine speed } NE/60 \times \text{number of fuel injections per rotation of crankshaft} \times \text{number of times mask process is executed per second} \quad (5)$$

The value of "target fuel injection amount×(increase coefficient RK−1)×coefficient T", which is obtained by multiplying the "target fuel injection amount×(increase coefficient RK−1)" by the "coefficient T" defined as described above, is a value indicating the increased amount of fuel in each cycle of the present process. The "present rich counter RC", which is obtained by adding the value of "target fuel injection amount×(increase coefficient RK−1)×coefficient T" to the "previous rich counter RC" is a cumulative value obtained when the increasing correction is being performed on the fuel injection amount by cumulating the amount of fuel increased in predetermined time intervals, that is, in each cycle of the present process. Accordingly, the total increased amount of fuel injected from when the increasing correction of the fuel injection amount starts to when the present process is presently executed is calculated from equation (5).

When the increasing correction of the fuel injection amount is being performed in this manner, the rich counter RC is calculated and updated.

When determined in step S500 that increasing correction is not being performed on the fuel injection amount, in step S520, it is determined whether or not the rich counter RC is "0" or less. When the rich counter RC is "0" or less, in step S530, execution of the active control and deterioration determination process is allowed, and the present process is then temporarily ended. In this manner, when the increasing correction is not being performed and the rich counter RC is "0" or less, the prohibition period is not provided, and the present process is temporarily ended.

When determined in step S520 that the rich counter RC exceeds "0", in step S540, the rich counter RC is decremented based on equation (6), and the present process is then temporarily ended.

$$\text{present rich counter } RC = \text{previous rich counter } RC - \text{decrement value } d \quad (6)$$

In equation (6), the "present rich counter RC" is the most recent rich counter RC calculated in the present cycle, and the "previous rich counter RC" is a past rich counter RC calculated in the previous cycle. Further, the decrement value d is a value for determining the time required for the value of the rich counter RC, which is decremented from when decrementing starts immediately after the increasing correction of the fuel injection amount ends, to become "0". Such time is set at a suitable value so that it corresponds to the influence period. The present process is repetitively performed so that the value of the rich counter RC is decreased by the decrement value d whenever step S540 is processed.

In this manner, in the mask process of the present embodiment, the rich counter RC is calculated and updated with equation (4) from when the increasing correction of the fuel injection amount starts to when it ends. This calculates the total increased amount of fuel when the fuel injection amount is being increased and corrected. Further, the decrementing of the rich counter RC starts when the increasing correction ends. When the value of the rich counter RC, which is decremented in each predetermined cycle, becomes "0" or less, it is determined that sufficient time has elapsed from when the increasing correction of the fuel injection amount has ended. More specifically, it is determined that the influence period has completely elapsed and that the oxygen occlusion amount C can be normally calculated. Thus, execution of the active control and deterioration determination process is allowed.

Figure 8:
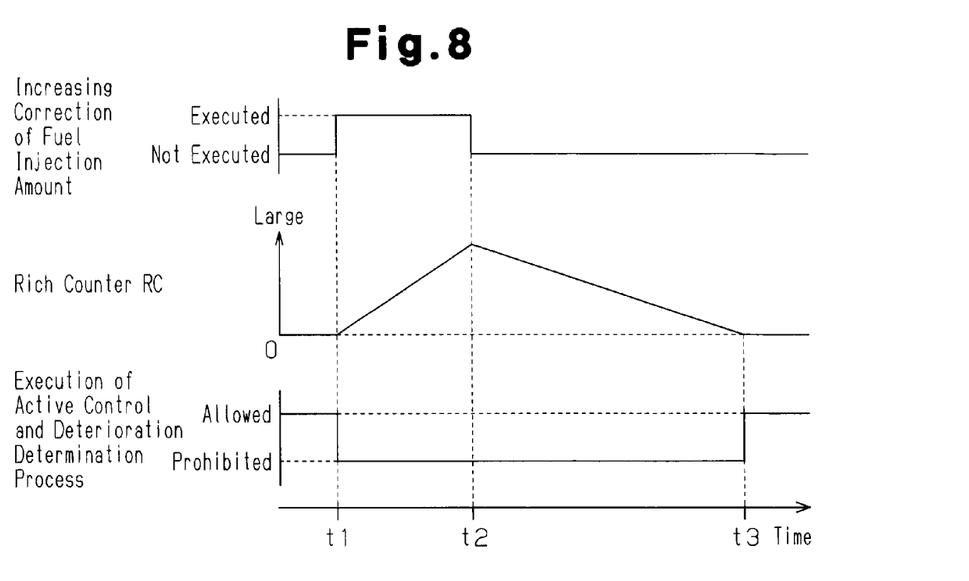
FIG. 8 is a timing chart showing changes in various values when performing the mask process of FIG. 7.

FIG. 8 shows changes in various values when performing the mask process.

At time t1, when the increasing correction of the fuel injection amount starts, execution of the active control and the deterioration determination process is prohibited. Further, calculation of the rich counter RC is started, and the value of the rich counter RC gradually increases. At time t2, when the increasing correction of the fuel injection amount ends, the calculation and updating of the rich counter RC, which is based on equation (4), is stopped. In this manner, the value of the rich counter RC is updated from when the increasing correction starts to when it ends. This reflects the total increased amount of fuel during the increasing correction on the final value of the rich counter RC at the point of time when the increasing correction ends.

At time t2, which is when the increasing correction ends, the decrementing of the rich counter RC starts based on equation (6). At time t3, when the value of the rich counter RC, which is decreased in each cycle of the mask process, becomes "0" or less, execution of the active control and the deterioration determination process is allowed.

The decrementing of the rich counter RC starts immediately after the increasing correction ends. Until the rich counter RC becomes "0" or less, execution of the deterioration determination process is prohibited. This sets the prohibition period (time t2 to time t3) that prohibits calculation of the oxygen occlusion amount C immediately after the increasing correction ends. By setting such a prohibition period, the oxygen occlusion amount C is calculated in a manner avoiding the period in which the oxygen occlusion amount C may be erroneously calculated due to the influence of residual unburned fuel.

The rich counter RC is increased during the increasing correction. After the increasing correction ends, the rich counter RC is decremented by the decrement value d, and execution of the deterioration determination value is prohibited until the decremented value becomes "0" or less. In this case, as the total increased amount of fuel increases during the increasing correction, that is, as the rich counter RC is larger at the point of time when the increasing correction ends, the period becomes longer from when the decrementing starts after the increasing correction ends to when the rich counter RC becomes "0" or less. In this manner, the present embodiment also variably sets the prohibition period to be longer as the total increased amount of fuel increases and the influence time becomes longer. Thus, the prohibition period is properly set in association with the time (influence period) required for the residual unburned fuel in the exhaust passage 13 to decrease to a level in which it does not affect the calculation of the oxygen occlusion amount C.

In this manner, the present embodiment also allows for the prohibition period to be set in a suitable manner. Thus, when calculating the oxygen occlusion amount C of the catalyst 18 after performing the increasing correction on the fuel injection amount, the oxygen occlusion amount C is calculated with further accuracy. This allows for the determination accuracy to be increased when performing the deterioration determination on the catalyst 18 after the increasing correction is performed on the fuel injection amount.

As described above, in addition to advantages (1) and (3) of the first embodiment, the present embodiment has the advantage described below.

(5) The total increased amount of fuel during the increasing correction is calculated by calculating and updating the rich counter RC from when the increasing correction of the fuel injection amount starts to when it ends. Further, the rich counter RC is decremented by the decrement value d from when the increasing correction ends, and the period until the decremented rich counter RC becomes "0" or less is set as the prohibition period. As a result, as the total increased amount of fuel increases, that is, as the time required for the residual unburned fuel in the exhaust passage 13 to decrease to a level in which it does not affect the calculation of the oxygen occlusion amount C becomes longer, the prohibition period is variably set to be longer. Thus, the prohibition period is properly set.

A third embodiment of the present invention will now be discussed with reference to FIGS. 9 and 10.

In the first embodiment, calculation of the oxygen occlusion amount C is prohibited until the elapsed time from immediately after the increasing correction of the fuel injection amount ends reaches the determination value B, which is set based on the total increased amount of the injected fuel during the increasing correction. In the present embodiment, such a prohibition period is set in a different manner. This point differs from the first embodiment. A deterioration determination device of the present embodiment will now be discussed centering on such differences.

Figure 9:
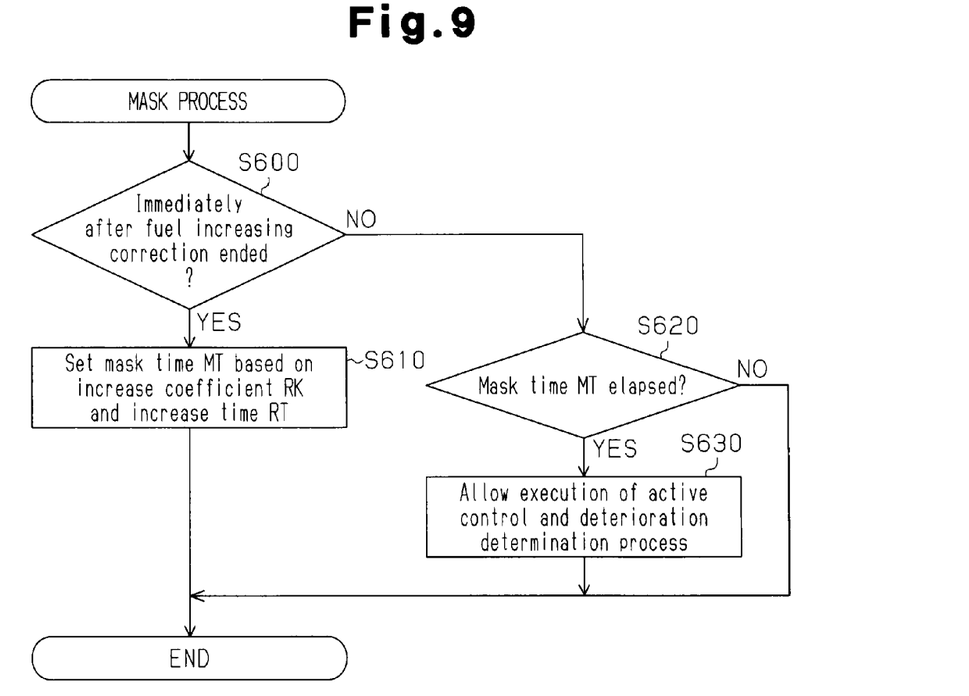
FIG. 9 is a flowchart showing procedures of a mask process in a third embodiment of the present invention.

FIG. 9 shows the processing procedures of a mask process executed in the present embodiment. The present process is repetitively performed in predetermined cycles by the ECU 22.

When the present process starts, first, in step S600, it is determined whether or not the increasing correction of the fuel injection amount has just ended.

When the increasing correction of the fuel injection amount has just ended, in step S610, a mask time MT is set based on an increase coefficient RK, which is set during the increasing correction, and an increase time RT, which is the time during which the increasing correction is performed. The increase coefficient RK is the same as the increase coefficient RK described in the second embodiment. That is, the increase coefficient RK is a value set based on the engine operation state and a value set as an increase correction value for the basic fuel injection amount when the fuel injection amount undergoes the increasing correction. Further, the mask time MT is a value for setting the prohibition period during which calculation is prohibited from immediately after when the increasing correction of the fuel injection amount ends to when the influence time elapses. The mask time MT is set by referring to a setting map prepared beforehand in a memory of the ECU 22.

Figure 10:
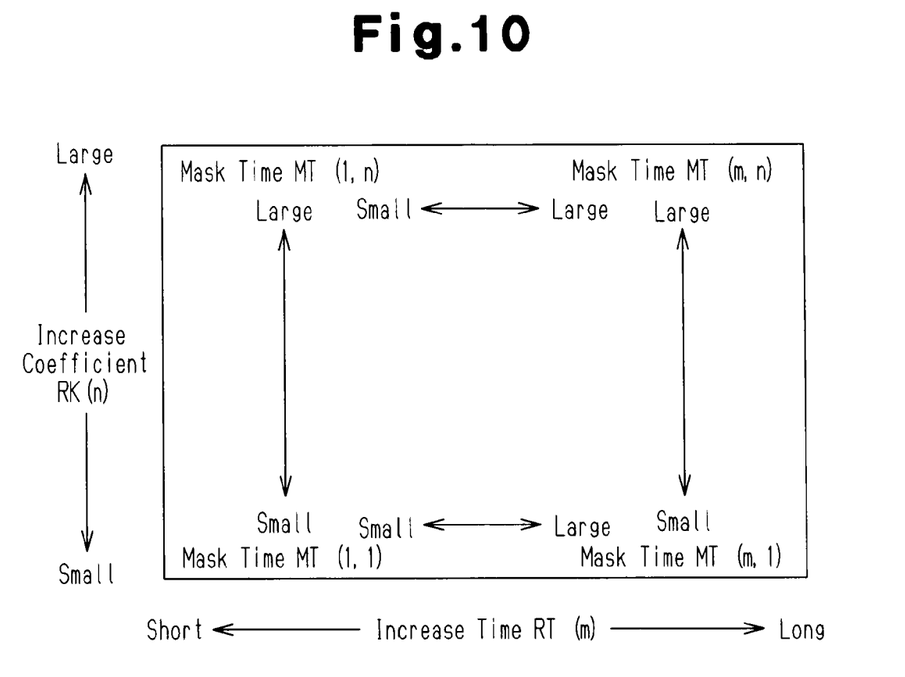
FIG. 10 is a map used to set a mask time shown in FIG. 9 based on an increase coefficient and an increase time.

Referring to FIG. 10, in the setting map, the value of the mask time MT is set to be longer as the increase coefficient RK becomes larger or as the increase time RT becomes longer, that is as the total increased amount of fuel increased during the increasing correction of the fuel injection amount and the influence time becomes longer.

When determined in step S600 that the increasing correction of the fuel injection amount has not just been ended, in step S620, it is determined whether the mask time MT, which is set from immediately after the increasing correction ends, has elapsed. When the mask time MT has not yet elapsed, the present process is temporarily ended. When the mask time MT has elapsed, in step S630, execution of the active control and deterioration determination process is allowed, and then the present process is temporarily ended.

In this manner, in the mask process of the present embodiment, the mask time MT, which corresponds to the prohibition time, is variably set in accordance with the increase coefficient RK and the increase time RT, that is, the total increased amount of fuel during the increasing correction of the fuel injection amount. When the mask time MT has elapsed from immediately after the increasing correction ends, sufficient time has elapsed from when the increasing correction of the fuel injection amount ends, that is, the influence time has completely elapsed. It is thus determined that the oxygen occlusion amount C may be normally calculated. Therefore, execution of the active control and the deterioration determination process is allowed.

In this manner, the present embodiment also allows for the prohibition period to be set in a suitable manner. Thus, when calculating the oxygen occlusion amount C of the catalyst 18 after performing the increasing correction on the fuel injection amount, the oxygen occlusion amount C is calculated with further accuracy. This allows for the determination accuracy to be increased when performing the deterioration determination on the catalyst 18 after the increasing correction is performed on the fuel injection amount.

As described above, in addition to advantage (1) of the first embodiment, the present embodiment has the advantage described below.

(6) The mask time MT corresponding to the prohibition period is set based on the setting map including the parameters of the increasing coefficient RK, which is an increase correction value set during the increasing correction, and the increase time RT, which is the time during which the increasing correction is executed. In the setting map, the mask time MT is variably set to be longer as the increase coefficient RK increases or as the increase time RT becomes longer. As a result, as the total increased amount of fuel increases during the increasing correction of the fuel injection amount, that is, as the time required for the residual unburned fuel in the exhaust passage 13 to decrease to a level in which it does not affect the calculation of the oxygen occlusion amount C becomes longer, the prohibition period for prohibiting calculation of the oxygen occlusion amount C after the increasing correction ends is variably set to be longer. Accordingly, the prohibition period is also properly set in this embodiment.

The above embodiments may be modified and practiced as described below.

In the first embodiment, the process for changing the mask execution flag MF to "ON" may be eliminated under the condition that the rich counter RC is greater than or equal to the determination value A. In this case, the mask execution flag MF may be changed from "OFF" to "ON" when the increasing correction of the fuel injection amount starts or immediately after the increasing correction of the fuel injection amount ends.

Also in the second embodiment, similar to the first embodiment, when the value of the rich counter RC during the increasing correction being performed on the fuel injection amount is less than the determination value A, the process for prohibiting calculation of the oxygen occlusion amount C from immediately after the increasing correction ends to when the prohibition period elapses may be suspended.

When calculating the rich counter RC, which indicates the total increased amount, equation (2) of which parameters are the air-fuel ratio and the intake air amount GA is used in the first embodiment, and equation (4) of which parameters are the target fuel injection amount, the increase coefficient RK, and the like is used in the second embodiment. However, the rich counter RC may be calculated through other forms. For example, equation (4) may be used to calculate the rich counter RC in the first embodiment, and equation (2) may be used to calculate the rich counter RC in the second embodiment. It is only required that a value corresponding to the total increased amount or a value which is the total increased amount itself may be calculated.

In the third embodiment, the mask time MT is set based on the increase coefficient RK and the increase time RT but instead may be set based on the air-fuel ratio when the increasing correction is being performed on the fuel injection amount and the increase time RT. In other words, in addition to an increase correction value set when performing the increase correction on the fuel injection amount, a value that is correlated to such an increase correction value may be used as the increase coefficient RK.

In each of the above embodiments, the increase coefficient RK is set so that the actual air-fuel ratio becomes equal to the target air-fuel ratio TAF, which is set to be richer than the stoichiometric air-fuel ratio. However, the increase coefficient RK may be set in other forms. For example, the increase coefficient RK may be set based on the engine operation state.

The air-fuel ratio sensor 19 and the oxygen sensor 20 are only required to be sensors that detect the oxygen concentration of the exhaust gas and consequently the air-fuel ratio of the air-fuel mixture. Therefore, the air-fuel ratio sensor 19 may be replaced by an oxygen sensor that detects only the richness or leanness of the air-fuel ratio. Further, the oxygen sensor 20 may be replaced by an air-fuel sensor that linearly obtains an output in accordance with the air-fuel ratio level (richness or leanness).

The invention claimed is:

1. A catalyst deterioration determination device for determining deterioration of an exhaust gas purging catalyst arranged in an exhaust passage of an internal combustion engine, the determination device comprising:
   An Electronic Control Unit with a programmable logic that is configured to:
   forcibly changes change an air-fuel ratio of an air-fuel mixture,
   calculate an oxygen occlusion amount of the catalyst based on an oxygen concentration of the exhaust gas at a downstream side of the catalyst that varies after the forcible changing of the air-fuel ratio, and
   perform deterioration determination on the catalyst based on the calculated oxygen occlusion amount, with the engine including a function for performing increasing correction on a fuel injection amount so that the air-fuel ratio of the air-fuel mixture becomes richer than the stoichiometric air-fuel ratio,
   set a prohibition period when calculating the oxygen occlusion amount after the increasing correction ends to prohibit calculation of the oxygen occlusion amount immediately after the increasing correction ends, and
   variably set the prohibition period to be longer as a total increased amount of fuel during the increasing correction increases.

2. The determination device according to claim 1, wherein the programmable logic calculates the total increased amount from when the increasing correction starts to when it ends, sets a determination value for an elapsed time from when the increasing correction ends to be larger as the total increased amount increases, and sets a period required for the elapsed time to reach the determination value as the prohibition period.

3. The determination device according to claim 1, wherein the prohibition unit calculates the total increased amount from when the increasing correction starts to when it ends, decrements the total increased amount by a predetermined amount from when the increasing correction ends, and sets a period required for the decremented total increased amount to become less than or equal to a predetermined value as the prohibition time.

4. The determination device according to claim 1, wherein the prohibition unit cumulates an increased amount of fuel in predetermined time intervals during the increasing correction and sets the cumulated value as the total increased amount.

5. The determination device according to claim 1, wherein the prohibition unit sets the prohibition period based on a map of which parameters are an increase correction value set during the increasing correction and an execution time of the increasing correction, and the map sets the prohibition time so that the prohibition time becomes longer as the increase correction value increases or as the execution time of the increasing correction becomes longer.

6. The determination device according to claim 1, wherein the prohibition unit allows the oxygen occlusion amount to be calculated during the prohibition period when the total increased amount has not reached a predetermined value.

7. The determination device according to claim 2, wherein the prohibition unit cumulates an increased amount of fuel in predetermined time intervals during the increasing correction and sets the cumulated value as the total increased amount.

8. The determination device according to claim 3, wherein the prohibition unit cumulates an increased amount of fuel in predetermined time intervals during the increasing correction and sets the cumulated value as the total increased amount.

9. The determination device according to claim 2, wherein the prohibition unit allows the oxygen occlusion amount to be calculated during the prohibition period when the total increased amount has not reached a predetermined value.

10. The determination device according to claim 3, wherein the prohibition unit allows the oxygen occlusion amount to be calculated during the prohibition period when the total increased amount has not reached a predetermined value.

11. The determination device according to claim 4, wherein the prohibition unit allows the oxygen occlusion amount to be calculated during the prohibition period when the total increased amount has not reached a predetermined value.

12. The determination device according to claim 5, wherein the prohibition unit allows the oxygen occlusion amount to be calculated during the prohibition period when the total increased amount has not reached a predetermined value.

13. The determination device according to claim 7, wherein the prohibition unit allows the oxygen occlusion amount to be calculated during the prohibition period when the total increased amount has not reached a predetermined value.

14. The determination device according to claim 8, wherein the prohibition unit allows the oxygen occlusion amount to be calculated during the prohibition period when the total increased amount has not reached a predetermined value.

* * * * *